(12) United States Patent
Sahinoglu et al.

(10) Patent No.: US 7,729,407 B2
(45) Date of Patent: Jun. 1, 2010

(54) SINGLE-PULSE AND MULTI-PULSE TRANSMITTED REFERENCE IMPULSE RADIO SYSTEMS WITH ENERGY DETECTING RECEIVERS

(75) Inventors: Zafer Sahinoglu, Watertown, MA (US); Sinan Gezici, Princeton, NJ (US)

(73) Assignee: Renesas Technology Corp., Tokyo (JP)

( * ) Notice: Subject to any disclaimer, the term of this patent is extended or adjusted under 35 U.S.C. 154(b) by 1396 days.

(21) Appl. No.: 11/054,318

(22) Filed: Feb. 10, 2005

(65) Prior Publication Data

US 2006/0209922 A1    Sep. 21, 2006

Related U.S. Application Data

(60) Provisional application No. 60/645,038, filed on Jan. 21, 2005.

(51) Int. Cl.
*H04B 1/00* (2006.01)
(52) U.S. Cl. .................. 375/138; 375/130; 375/351; 375/147; 375/340
(58) Field of Classification Search .......... 375/130, 375/138, 351, 147, 340
See application file for complete search history.

(56) References Cited

U.S. PATENT DOCUMENTS

| | | | | |
|---|---|---|---|---|
| 6,560,272 | B1 * | 5/2003 | Komatsu | 375/147 |
| 2003/0108133 | A1 * | 6/2003 | Richards | 375/351 |
| 2005/0175125 | A1 * | 8/2005 | Krivokapic | 375/340 |
| 2005/0249264 | A1 * | 11/2005 | Suzuki et al. | 375/130 |
| 2006/0234761 | A1 * | 10/2006 | Nagasaka | 455/552.1 |
| 2008/0204322 | A1 * | 8/2008 | Oswald et al. | 342/465 |

OTHER PUBLICATIONS

Federal Communication Commission, First Report and Order, FCC 02-48, "Revision of Part 15 of the Commission's Rules Regarding Ultra-Wideband Transmission Systems", ET docket 98-153, Adopted: Feb. 14, 2002, Released: Apr. 22, 2002, pp. 1-118.

Ralph Hoctor et al., "Delay-Hoped Transmitted-Reference RF Communications", IEEE Conference on Ultra Wideband Systems and Technologies, 2002, pp. 265-269.

Moe Z. Win et al., "Impulse Radio: How it Works", IEEE Communications Letters, vol. 2, Feb. 1998, pp. 36-38.

(Continued)

*Primary Examiner*—Shuwang Liu
*Assistant Examiner*—Kabir A Timory
(74) *Attorney, Agent, or Firm*—Oblon, Spivak, McClelland, Maier & Neustadt, L.L.P.

(57) ABSTRACT

A transmitted reference ultra-wide band communication signal embodied in an electromagnetic wave and configured to communicate a data value includes a first frame having a first reference pulse and a first data pulse. The first reference pulse has a reference polarity and the first data pulse has a data polarity. The first reference pulse is separated from the first reference pulse by a delay time. The reference polarity is set based on a predetermined reference value and a first pseudo-random polarity code sequence, and the data polarity is set based on the data value and a second pseudo-random polarity code sequence. A receiver configured to receive the signal, a transmitter configured to transmit the signal, and a system of transmitters and receivers are also provided.

13 Claims, 7 Drawing Sheets

OTHER PUBLICATIONS

Fredrik Tufvesson et al., "Ultra-Wideband Communication using Hybrid Matched Filter Correlation Receivers", Proc. IEEE Vehicular Technology Conference (VTC 2004 Spring), Milan, Italy, May 17-19, 2004.

Nick van Stralen, "Delay Hopped Transmitted Reference Experimental Results", IEEE conference on Ultra Wideband Systems and Technologies, 2002, pp. 93-98.

John D. Choi et al., "Performance of Ultra-Wideband Communications With Suboptimal Receivers in Multipath Channels", IEEE Journal on selected areas in communications, vol. 20, No. 9, Dec. 2002, pp. 1754-1766.

Vincenzo Lottici et al., "Channel Estimation for Ultra-Wideband Communications", IEEE Journal on selected areas in communications, vol. 20, No. 9, Dec. 2002, pp. 1638-1645.

Eran Fishler et al., "On the Tradeoff Between Two Types of Processing Gain", Proceedings of the 40th Annual Allerton Conference on Communication, Control, and Computing, Monticello, IL, Oct. 2-4, 2002, 10 pages.

Yves-Paul Nakache et al., "Spectral Shape of UWB Signals Influence of Modulation Format, Multiple Access Scheme and Pulse Shape", Proceedings of the IEEE Vehicular Technology Conference, (VTC 2003-Spring), vol. 4, pp. 2510-2514, Jeju, Korea, Apr. 2003.

Kyuntg Su Park, et al., "An Advanced Channel Access Scheme for Integrated Multimedia Services with Various Bit Rates in CDMA Networks", IEEE Communications Letters, vol. 3, No. 4, Apr. 1999, pp. 91-93.

Sumeeth Nagaraj et al., "A Channel Accessing Scheme with Joint Detection Receivers in Ad Hoc Networks", Wireless Communications and Networking Conference, 2004, WCNC, 2004, IEEE, vol. 1, pp. 381-386, Mar. 2004.

Nan Guo et al., "On Sequence Sharing for Multi-Code DS/CDMA Systems", Military Communications Conference, 1998, MILCOM 98 Proceedings, IEEE, vol. 1, pp. 238-242.

* cited by examiner

United States Patent

SINGLE-PULSE AND MULTI-PULSE TRANSMITTED REFERENCE IMPULSE RADIO SYSTEMS WITH ENERGY DETECTING RECEIVERS

CROSS REFERENCE TO A RELATED APPLICATION

This application claims the benefit of U.S. Provisional Application No. 60/645,038, filed Jan. 21, 2005, the entire contents of which are hereby incorporated by reference.

BACKGROUND OF THE INVENTION

1. Field of the Invention

The present invention relates generally to radio communication systems, and more particularly to receivers for ultra wide bandwidth (UWB) systems.

2. Discussion of the Background

With the release of the "First Report and Order," Feb. 14, 2002, by the Federal Communications Commission (FCC) FCC 02-48, incorporated herein in its entirety, interest in ultra wide bandwidth (UWB) communication systems has increased. UWB communication systems spread information over a wide bandwidth of at least 500 MHz. Due to this spreading operation, the power spectral density, and thus the interference to narrow bandwidth receivers is small.

Conventional transmitted reference UWB (TR-UWB) systems such as discussed in R. Hoctor and H. Tomlinson, "Delay-hopped transmitted-reference RF communications," *Proceedings of the IEEE Conference of Ultra Wideband Systems and Technologies* 2002 (*UWBST'02*), pp. 265-269, Baltimore, Md., May 2002, N. v. Stralen, A. Dentinger, K. Welles II, R. Gaus, R. Hoctor, and H. Tomlinson, "Delay hopped transmitted reference experimental results," *Proceedings of the IEEE Conference of Ultra Wideband Systems and Technologies* 2002 (*UWBST'02*), pp. 93-98, Baltimore, Md., May 2002, F. Tufvesson and A. F. Molisch, "Ultra-wideband communication using hybrid matched filter correlation receivers," *Proc. IEEE Vehicular Technology Conference* (*VTC* 2004 Spring), Milan, Italy, May 17-19, 2004, J. D. Choi and W. E. Stark, "Performance of ultra-wideband communications with suboptimal receivers in multipath channels," *IEEE Journal on Selected Areas in Communications*, vol. 20, issue 9, pp. 1754-1766, December 2002, (each of which is incorporated herein in its entirety) relax the stringent timing requirements of the impulse radio (IR) systems, as discussed M. Z. Win and R. A. Scholtz, "Impulse radio: How it works," *IEEE Communications Letters*, 2(2): pp. 36-38, February 1998, incorporated herein in its entirety, and do not need any channel estimation, which is a challenging task for coherent UWB receivers, as discussed in V Lottici, A. DAndrea, and U. Mengali, "Channel estimation for ultra-wideband communications," *IEEE Journal on Selected Areas in Communications*, vol. 20, issue 9, pp. 1638-1645, December 2002, which is incorporated herein in its entirety.

Conventional impulse radio systems have used pseudo-random polarity codes to modify the data pulses, for example according to E. Fishler and H. V Poor, "On the tradeoff between two types of processing gain," *Proceedings of the 40th Annual Allerton Conference on Communication, Control, and Computing*, Monticello, Ill., Oct. 2-4, 2002, which is incorporated herein in its entirety. Use of pseudo-random polarity codes helps reduce the spectral lines in the power spectral density of the transmitted data pulses in impulse radio signals, for example as discussed in Y.-P. Nakache and A. F. Molisch, "Spectral shape of UWB signals influence of modulation format, multiple access scheme and pulse shape," *Proceedings of the IEEE Vehicular Technology Conference*, (*VTC* 2003-Spring), vol. 4, pp. 2510-2514, Jeju, Korea, April 2003, which is incorporated herein in its entirety.

Problems with conventional TR-UWB systems and apparatuses, for example as proposed in Hoctor, include a waste of energy on the reference pulses and the effect of using a noisy template signal which causes a large noise-noise term. To reduce the effects of the noise-noise terms, conventional approaches have been proposed to first pass the received signal through a matched filter (see Tufvesson), or to perform an averaging operation (see Choi). However, conventional approaches disadvantageously rely upon a delay line for signal detection.

Figure 8:
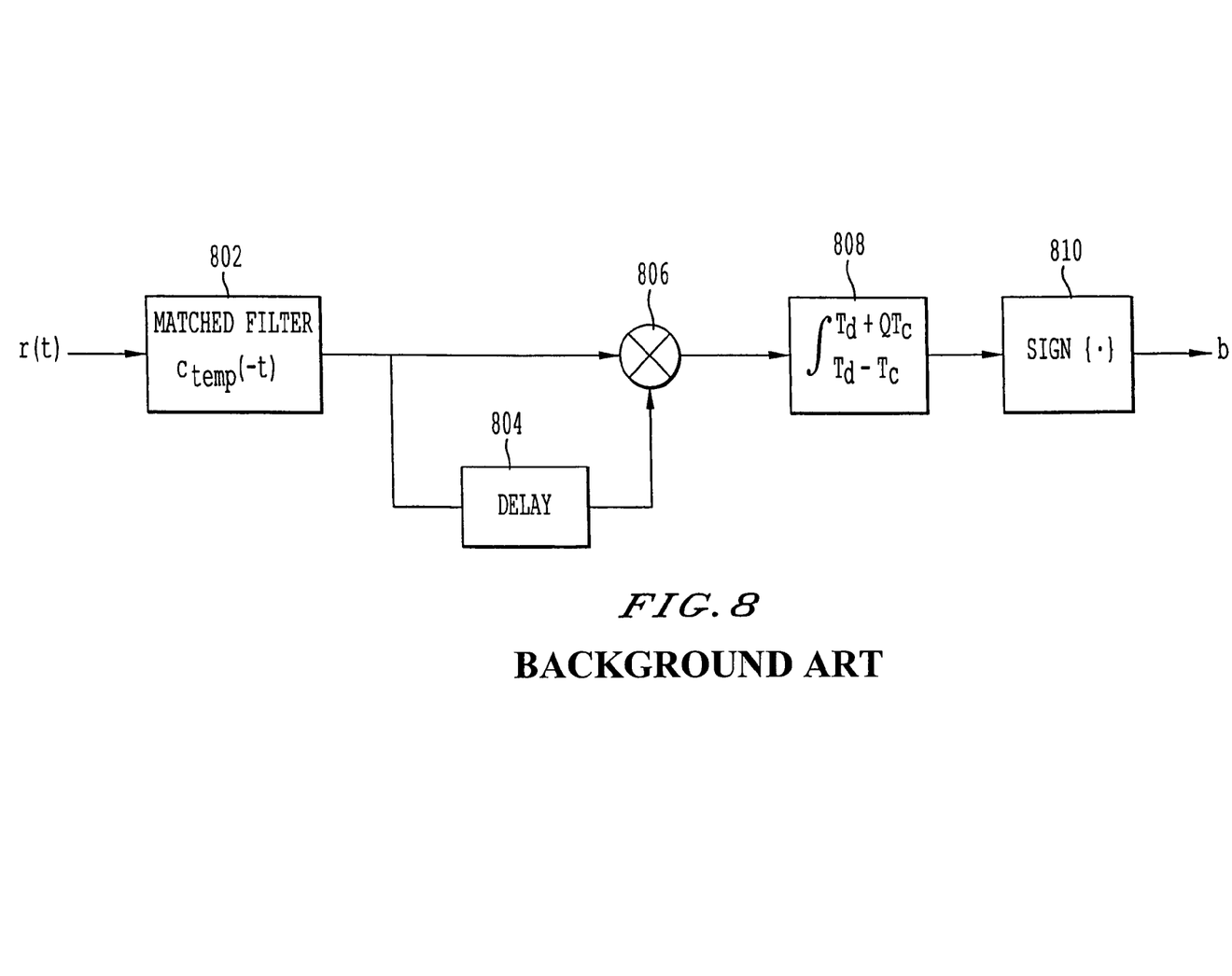
FIG. 8 is a block diagram of a conventional receiver.

FIG. 8 shows an example of a conventional TR-UWB receiver. In this example, a received signal r(t) is passed through a matched filter 802. The convention matched filter 802 is designed to match the entire incoming signal and assumes that data and reference pulses are always ordered the same way (i.e., data pulse is always first, or reference pulse is always first). An impulse response of the conventional matched filter 802 is equal to $c_{temp}(-t)$, where the filter is matched to the sequence of the reference pulses for the related information symbol. The output of the matched filter 802 is delayed by delay line 804 and the delayed output is multiplied with the undelayed output of the matched filter 802 by multiplier 806. The delay amount is the delay time between first and second pulses in a frame of the received signal. The output of the multiplier 806 is passed through an integrator 808 to produce an output that is averaged over at least one chip time in the received signal. The output of the integrator 708 is passed through a sign detector 810 to produce an estimated data bit b.

SUMMARY OF THE INVENTION

Accordingly, one object of the invention is to provide a novel transmitted reference ultra-wide band communication signal embodied in an electromagnetic wave and configured to communicate a data value. The signal includes a first frame having a first reference pulse and a first data pulse. The first reference pulse has a reference polarity and the first data pulse has a data polarity. The first reference pulse is separated from the first data pulse by a delay time. The reference polarity is set based on a predetermined reference value and a first pseudo-random polarity code sequence, and the data polarity is set based on the data value and a second pseudo-random polarity code sequence.

Another object of the invention is to provide a transmitted reference ultra-wide band communication signal receiver that includes a matched filter configured to produce a filtered signal from a received signal, an energy detector operatively connected to the matched filter and configured to produce a detected energy signal based on a detected energy in the filtered signal, and a decision unit operatively connected to the energy detector and configured to determine a value of data in the received signal based on the detected energy signal. The received signal includes a first frame having a first reference pulse and a first data pulse. The first reference pulse has a reference polarity, and the first data pulse has a data polarity. The first data pulse is separated from the first reference pulse by a delay time. The reference polarity is set based on a predetermined reference value and a first pseudo-random polarity code sequence. The data polarity is set based on the data value and a second pseudo-random polarity code sequence. The matched filter has an impulse response that is an inverse of a template signal. The template signal includes a template frame having first and second template pulses with a predetermined template polarity, and the first template pulse is separated from the second template pulse by the delay time.

Another object of the invention is to provide a transmitted reference ultra-wide band communication signal receiver. The receiver includes a first matched filter configured to produce a first filtered signal from a received signal, a first energy detector operatively connected to the first matched filter and configured to produce a first detected energy signal based on a detected energy in the first filtered signal, a second matched filter configured to produce a second filtered signal from the received signal, a second energy detector operatively connected to the second matched filter and configured to produce a second detected energy signal based on a detected energy in the second filtered signal, and a decision unit operatively connected to the first and second energy detectors and configured to determine a value of data in the received signal based on the first and second detected energy signals. The received signal includes a first frame having a first reference pulse and a first data pulse. The first reference pulse has a reference polarity, and the first data pulse has a data polarity and is separated from the first reference pulse by a delay time. A wave shape of the first data pulse is different from a wave shape of the first reference pulse. The reference polarity is set based on a predetermined reference value and a first pseudo-random polarity code sequence. The data polarity is set based on the data value and a second pseudo-random polarity code sequence. The first matched filter has a first impulse response that is an inverse of a first template signal. The first template signal includes a first template frame having a first template pulse with a predetermined template polarity. A wave shape of the first template pulse is the same as the wave shape of the first data pulse. The second matched filter has a second impulse response that is an inverse of a second template signal. The second template signal includes a second template frame that has a second template pulse with a predetermined template polarity. A wave shape of the second template pulse is the same as the wave shape of the first reference pulse.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
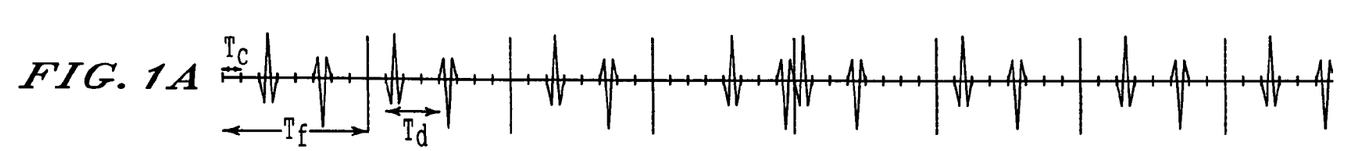
FIG. 1A is a signal diagram of a received single-pulse signal according to an embodiment of the present invention.

Referring now to the drawings, wherein like reference numerals designate identical or corresponding parts throughout the several views, and more particularly to FIG. 1A thereof, which is a signal diagram of a single-pulse received signal according to an embodiment of the present invention.

The received signal in a single user multipath environment can be expressed as $$r(t) = \sum_{l=0}^{L-1} \alpha_l s(t - \tau_l) + \sigma_n n(t), \tag{1}$$

where $\alpha_{l \, and \, \tau_l}$ are, respectively, the fading coefficient and the delay of the lth path, n(t) is a zero mean white Gaussian process with unit spectral density, and s(t) is given by $$s(t) = \sqrt{\frac{E_s}{2N_f}} \sum_{j=-\infty}^{\infty} [b_{1,j} d_{2j} w_{2j}(t - jT_f - c_j T_c) + \\ b_{2,j} d_{2j+1} w_{2j+1}(t - jT_f - c_j T_c - T_d)]. \tag{2}$$

In equation (2), $w_{2j}(t)$ and $w_{2j+1}(t)$ are the UWB pulses transmitted in the jth frame, $T_f$ is the frame time, $T_c$ is the chip interval, $N_f$ is the number of frames per information symbol, and $T_d$ is the delay between the two pulses in a frame, which is assumed to be an integer multiple of the chip interval; that is, $T_d = \Delta T_c$. $E_s$ represents the energy per symbol (i.e., total energy of $2N_f$ pulses for one symbol). The time hopping code is denoted by $\{c_j\}$, which can take values in $\{0, 1, \ldots, N_c-1\}$, with $N_c = T_f/T_c$ being the number of chips per frame. Pseudo-random polarity codes, $d_j$, are independent and identically distributed (IID) binary pseudo-random variables taking values±1 with equal probability, and are applied to both reference and data pulses. Use of pseudo-random polarity codes for both reference and data pulses helps reduce the spectral lines in the power spectral density of the transmitted signal, and mitigates the effects of Multiple Access Interference (MAI). The receiver is assumed to know the polarity code. For example, the polarity code in use may be selected in common by design of the transmitters and receivers, or the polarity code may be shared dynamically or periodically by agreed upon protocol or sharing of sequence seed information. For example, polarity code sharing schemes may include those as discussed in Park, Kyung Su and Cho, Dong Ho, "An advanced channel access scheme for integrated multimedia services with various bit rates in CDMA networks," *Communications Letters, IEEE*, vol. 3, issue 4, pp. 91-93, April 1999; Guo, N. and Milstein, L. B., "On sequence sharing for multi-code DS/CDMA systems," *Military Communications Conference*, 1998, *MILCOM 98 Proceedings*, IEEE, Volume 1, pp. 238-242; and Nagaraj, S. and Schlegel, C, "A channel accessing scheme with joint detection receivers in ad hoc networks," *Wireless Communications and Networking Conference*, 2004, *WCNC*, 2004, IEEE, vol. 1, pp. 21-25, March, 2004.

The information bit is represented by $b_{1,j}$ or $b_{2,j}$. In one embodiment, only one of those carries the information in a given frame, which is equal to $b_{\lfloor j/N_f \rfloor} \in \{-1, +1\}$, and the other one is predetermined to be equal to one of $-1$ or $+1$. However, alternative embodiments are possible having two data pulses in one frame and two reference pulses in another frame. The pulse that carries the information is called the data pulse, and the other pulse in the frame is called the reference pulse. For a single-pulse system, either pulse may be designated as the reference pulse.

FIG. 1A is a signal diagram of a single-pulse received signal according to an embodiment of the present invention. In FIG. 1A, $N_f = N_c = 8$, $T_d = \Delta T_c$ with $\Delta = 3$, and the time hopping sequence is $\{2, 1, 2, 4, 0, 1, 2, 2\}$, although other combinations of values may alternatively be used. For the purposes of simplified explanation, no polarity codes are shown (that is, $d_j = 1$ for all values of j), and the information bit $-1$ is transmitted, as can be observed by the polarity of the data pulses. However, the present invention includes the use of polarity codes in the data pulses and the information bit may be set to $-1$ or $+1$ according to the information content of the received signal.

For the received signal of a single-pulse embodiment, one type of UWB pulse is employed in all the frames. Thus, $w_j(t) = w(t)$ for all j, or in other words, the wave shape of each pulse is the same for all frames. A pulse wave shape may be selected from any conventional UWB pulse wave shapes, including for example a wave shape described by a modified Hermite pulse polynomial.

Further, in the present embodiment, the information bit is carried by the second pulse in the frame. However, the invention includes alternative embodiments in which the information bit is carried by the first pulse in the frame, or in which the information bit is carried by the first pulse or second pulse depending upon a frame sequence of the frame. In the embodiment of FIG. 1A, the first pulse is the reference pulse, and the second one is the data pulse; that is, $b_{1,j} = 1$ and $b_{2,j} = b_{\lfloor j/N_f \rfloor}$ for all j.

The signal for the illustrated single pulse embodiment includes IID polarity codes for each pulse to advantageously reduce interference and smooth the power spectral density.

Figure 1B:
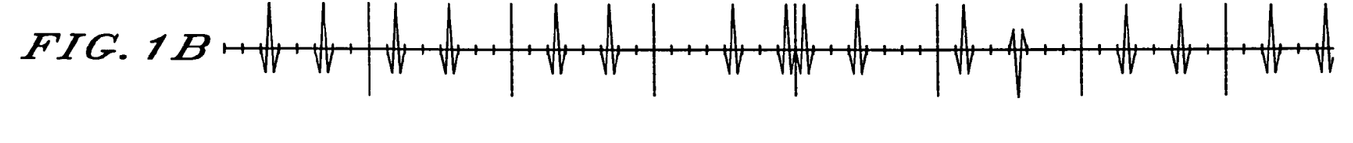
FIG. 1B is a signal diagram of a single-pulse template signal according to an embodiment of the present invention.

The received signal in equation (1) is correlated with the following template signal $$s_{temp}(t) = \frac{1}{\sqrt{2N_f}} \sum_{j=0}^{N_f - 1} [d_{2j} w(t - jT_f - c_j T_c) + d_{2j+1} w(t - jT_f - c_j T_c - T_d)], \quad (3)$$

and obtains the filtered signal y(t) as $$y(t) = \int r(\tau) s_{temp}(t - \tau) d\tau. \quad (4)$$

Note that in equation (3), only the 0th bit is considered to simplify the explanation. However, the present invention includes the consideration of each other bit as well, according to equation (3).

Note that in the absence of noise and multipath, and when the time-hopping sequence is constrained to $\{0, 1, \ldots, N_c - \Delta - 1\}$, $$y(t) = \sqrt{E_s} R(t) \text{ for } -T_c \leq t \leq T_c,$$

where $R(t) = \int w(\tau - t) w(\tau) d\tau$ is the auto-correlation of the UWB pulse, when $b_0 = +1$. For $b_0 = -1$, $$y(t) = 0 \text{ for } -T_c \leq t \leq T_c.$$

Therefore, the information bit can be detected by a simple energy detection operation over $(-T_c, T_c)$.

The same idea can be extended to the multipath case, but the energy detection operation needs to be performed over a larger interval. Hence, the decision variable Y is determined according to $$Y = \int_{-T_c}^{QT_c} |y(t)|^2 dt, \quad (5)$$

where Q determines the integration interval. A value of Q is selected depending upon a multipath profile of the channel and on the distance between the reference and the data pulses if this distance is smaller than the multipath delay spread. In other words, Q is selected to collect as much multipath energy as possible without getting interference from other pulses.

Then, the bit estimate can be expressed as $$\hat{b}_0 = \text{sign}\{Y - \delta\}, \quad (6)$$

where $\delta$ is a pre-determined threshold. In other words,
$b_0 = +1$, if $Y - \delta > 0$, and
$b_0 = -1$, if $Y - \delta < 0$.

FIG. 1B is a signal diagram of a possible template signal for an embodiment of a single-pulse system according to equation (3).

Figure 2:
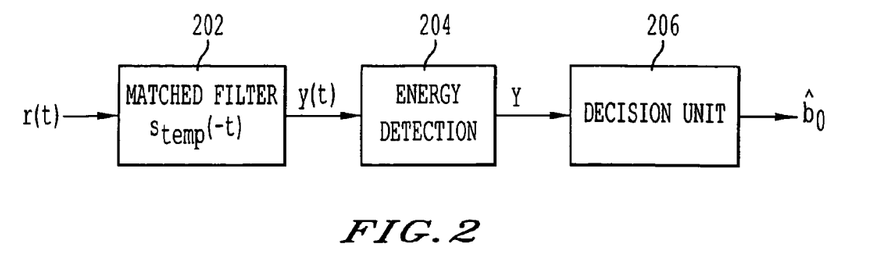
FIG. 2 is a block diagram of a single-pulse receiver according to an embodiment of the present invention.

FIG. 2 is a block diagram of a single-pulse receiver according to an embodiment of the present invention. In the single-pulse receiver of this embodiment, a matched filter 202 receives a signal r(t) and outputs a filtered signal y(t). An impulse response of the matched filter is set to the inverse of a template signal $s_{temp}(t)$. Further, the template signal $s_{temp}(t)$ includes the pseudo-random polarity code sequence used to encode the transmitted signal. Hence, the filter implicitly decodes the polarity codes. The filtered signal y(t) is received by an energy detector 204 to produce an energy detected signal Y. The energy detected signal Y is received by a decision unit 206 to produce an estimated information bit $b_0$ based on the energy detection and a pseudo-random sequences corresponding to a random encoding of each reference and/or data pulse. By considering a special template signal and passing the received signal through a matched filter whose impulse response is the inverse of that template signal, a receiver according to the present invention may be implemented without using a delay line. Thus, a receiver according to the present invention may be more easily and simply produced using an energy detector to perform bit estimation.

A multi-pulse embodiment of the present invention extends the single-pulse embodiment to use different types of UWB pulses (i.e., pulses having different wave shapes) in order to have robustness against inter-frame interference (IFI) and MAI. The multi-pulse embodiment includes a multi-pulse signaling scheme in which the first or the second pulse in a frame is the reference pulse depending on the frame index (i.e., a position of the frame in a frame sequence). This feature advantageously improves rejection of interference.

FIGS. 3A-3E are signal diagrams for elements of a multi-pulse signal according to an embodiment of the present invention. In this multi-pulse signal embodiment, there are $N_p$ different types of pulses, having $w_j = w_{j+kN_p}$, for any integer k. For the purposes of simplified explanation, $N_f$ is an integer multiple of $N_p$, where $N_p$ is an even number. However, other combinations of values are also included in the present invention.

Figure 3A:
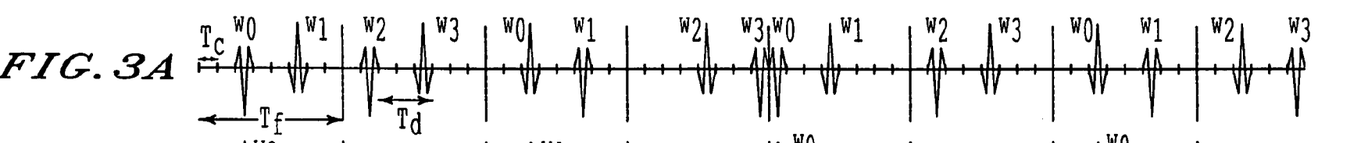
FIG. 3A is a signal diagram of a received multi-pulse signal according to an embodiment of the present invention.
Figure 3B:
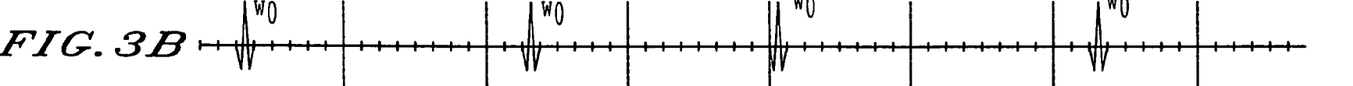
FIG. 3B is a signal diagram of a first template signal according to an embodiment of the present invention.
Figure 3C:
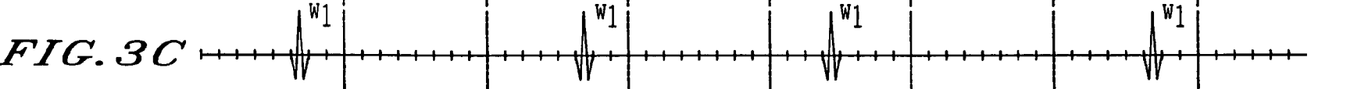
FIG. 3C is a signal diagram of a second template signal according to an embodiment of the present invention.
Figure 3D:
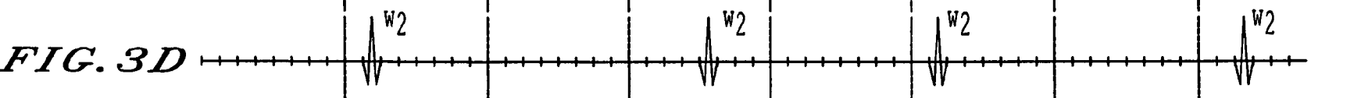
FIG. 3D is a signal diagram of a third template signal according to an embodiment of the present invention.
Figure 3E:
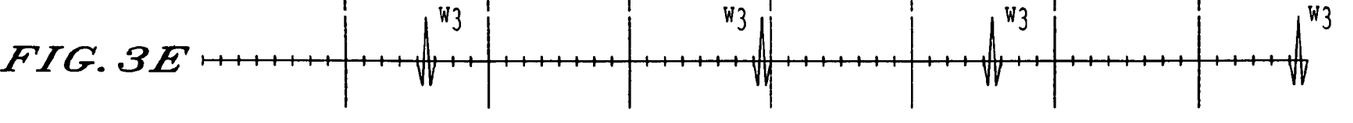
FIG. 3E is a signal diagram of a fourth template signal according to an embodiment of the present invention.

For this system, the information is carried by the first pulses in the frames for the first $N_p/2$ frames. Then, it is carried by the second pulses for the next $N_p/2$ frames, and it continues in this alternative fashion during the symbol period. Alternatively, the information is carried by the second pulses in the frames for the first $N_p/2$ frames and is carried by the first pulses in the frames for the next $N_p/2$ frames. In this signal, the information bit is denoted by $b_{1,j}$ or $b_{2,j}$ of (2) by the following equations:

$$b_{1,j} = b_{\lfloor j/N_f \rfloor} - (\lfloor j/(N_p/2) \rfloor)_2 (b_{\lfloor j/N_f \rfloor} - 1), \quad (7)$$

$$b_{2,j} = 1 + (\lfloor j/(N_p/2) \rfloor)_2 (b_{\lfloor j/N_f \rfloor} - 1), \quad (8)$$

where $(x)y$ denotes x modulo y.

The example multi-pulse signal of FIG. 3A includes four different pulse shapes ($N_p=4$), and eight frames per information bit ($N_f=8$). The pulse shapes may be any pulse shape, for example a Modified Hermite polynomial pulse (MHP) shape. Further, in this multi-signal embodiment, $N_f=N_c=8$, $T_d=\Delta T_c$ with $\Delta=3$, and the time hopping sequence is $\{2, 1, 2, 4, 0, 1, 2, 2\}$, although other values are possible. For the purposes of simplified explanation, no polarity codes are shown (that is, $d_j=1$ for all values of j), and the information bit −1 is transmitted. However, the invention includes the use of polarity codes. The ordering of data and reference pulses in a frame is determined by where in the frame sequence the frame is located. In the present embodiment, first pulses in frames 1, 2, 5, and 6, and the second pulses in frames 3, 4, 7, and 8 are the data pulses, while the remaining ones are the reference pulses. Other arrangements of reference/data pulse selection by frame are also possible.

FIGS. 3B-3E are signal diagrams of template signals for pulse types 0, 1, 2 and 3, respectively, according to equation (9) in an embodiment of the present invention. Note that each pulse in the drawings are illustrated with the same shape for simplicity. However, the template signal employs different UWB pulses, as shown by the different labels.

A receiver for the multi-pulse system can exhibit better resistance against multiple-access and inter-frame interference than a single-pulse receiver. The receiver for the multi-pulse system correlates the received signal in (1) with $N_p$ different template signals, which are expressed as $$s_{temp,n}(t) = \sqrt{\frac{N_p}{2N_f}} \sum_{j=0}^{\frac{2N_f}{N_p}-1} d_{jN_p+n} w_n(t - T_{j,n}), \quad (9)$$

for $n=0, 1, \ldots, N_p-1$, where $T_{j,n} = (jN_p/2 + \lfloor n/2 \rfloor) T_f + c_{jN_p/2 + \lfloor n/2 \rfloor} T_c + (n)_2 T_d$.

Note that the nth template is designed to combine the pulses of type n. Because of the structure of the data and reference pulses (see equation (7)), the template signal deals with equal number of reference and data pulses.

After the de-spreading operation by the nth template, we get $$y_n(t) = \int r(\tau) s_{temp,n}(t-\tau) d\tau. \quad (10)$$

Then, the nth decision variable is obtained as $$Y_n = \int_{-T_c}^{Q_n T_c} |y_n(t)|^2 dt, \quad (11)$$

where $Q_n$ determines the integration interval for the nth branch.

The bit estimate can be obtained by comparing the combined decision variables to a threshold:

$$\hat{b}_0 = \text{sign}\left(\sum_{n=0}^{N_p-1} Y_n - \delta\right) \quad (12)$$

where it is also possible to introduce weighting coefficients for each contribution according to some factors, such as the pulse shape. Alternatively, hard decisions can be made at each branch and a majority rule can be employed for the final bit estimate.

A multi-pulse receiver according to the present invention advantageously provides resistance against MAI and IFI since different pulses with good cross-correlation properties can be used. For example, modified Hermite pulses exhibit a small correlation term for all different delays, thus reducing the effects of IFI and MAI. A single-pulse receiver can also provide better suppression of the noise-noise term than conventional receivers since the single-pulse receiver combines more pulses before the energy detection stage. Depending on the effectiveness of the noise components and complexity constraints, one of the single-pulse receiver and the multi-pulse receiver can be chosen over the other.

Figure 4:
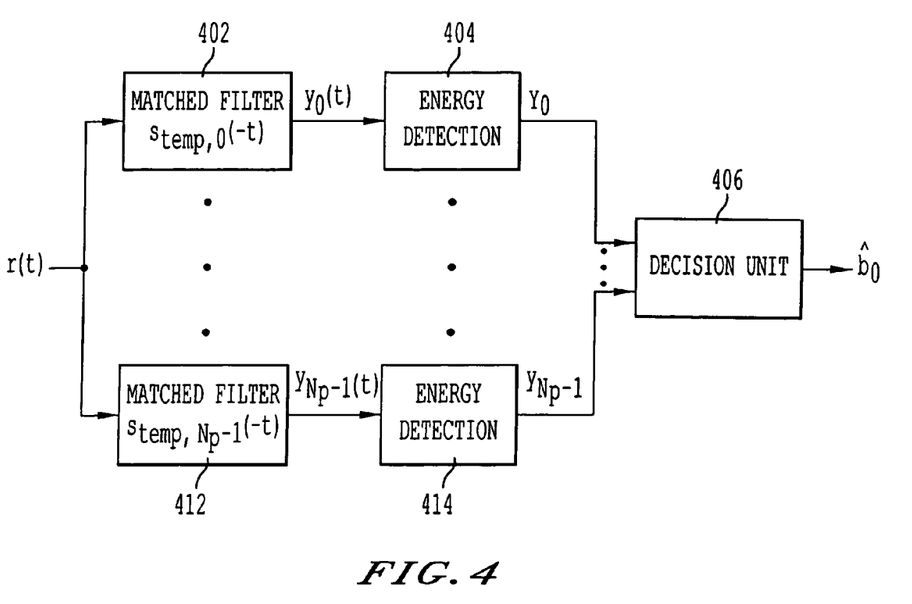
FIG. 4 is a block diagram of a multi-pulse receiver according to an embodiment of the present invention.

FIG. 4 is a block diagram of a multi-pulse receiver according to an embodiment of the present invention. In the present embodiment, each of plural matched filters 402/412 receive the received signal r(t). The impulse response of each of the matched filters is equal to an inverse of a template signal $s_{temp,n}(-t)$ of one of the pulse wave shapes used. Further, each template signal $s_{temp,n}(-t)$ includes the pseudo-random polarity code sequence used to encode that portion of the transmitted signal. Hence, the matched filter implicitly decodes the polarity codes. The matched filters 402/412 each output a filtered signal $y_{N_p-1}(t)$, which is received by a respective energy detector 404/414. The output of each of the energy detectors 404/414 are received by decision unit 406 which produces estimated information bit $b_0$ based on the combined energy detection and one or more pseudo-random sequences corresponding to a random encoding of each reference and/or data pulse.

Figure 5:
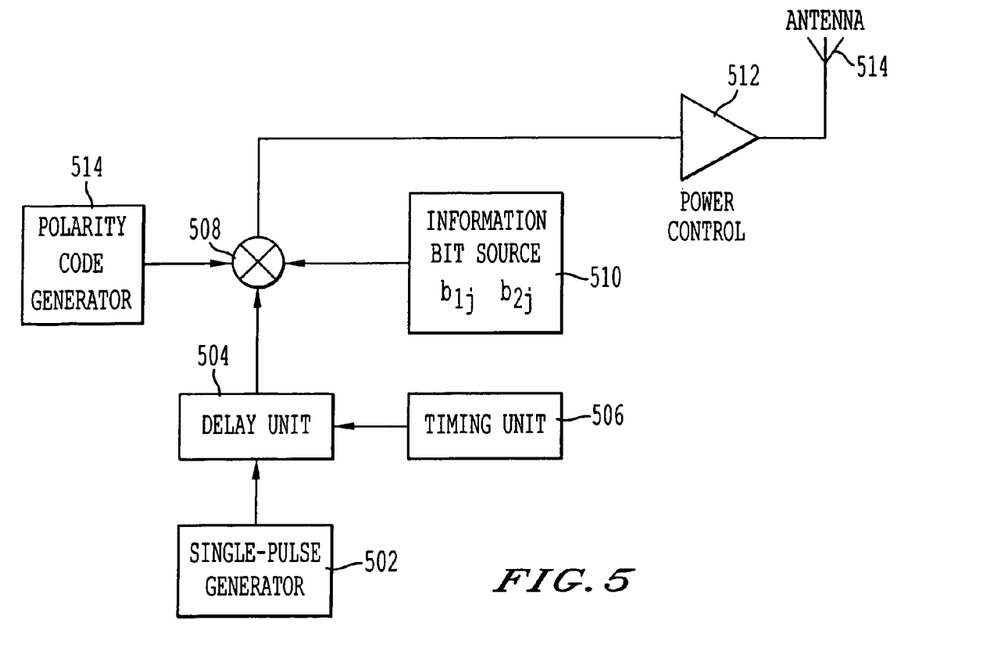
FIG. 5 is a block diagram of a single-pulse transmitter according to an embodiment of the present invention.

FIG. 5 is a block diagram of a single-pulse transmitter according to an embodiment of the present invention. In this embodiment, the pulse wave forms are produced by a single-pulse generator 502. The pulses are delayed by delay unit 504, which is controlled by timing unit 506. Thus, timing unit 506 controls the time delay between reference and data pulses and also frame starting and ending instants. At least one pseudo-random sequence is output from a polarity code generator 514. The delayed pulses from delay unit 504, the pseudo-random sequence from polarity code generator 514 and an appropriate information bit produced by information bit source 510 are multiplied by multiplier 508. Further, a different pseudo-random sequence may be used for each of the data and reference pulses. The product of the multiplier 508 is amplified by power control 512 and transmitted using antenna 514.

Figure 6:
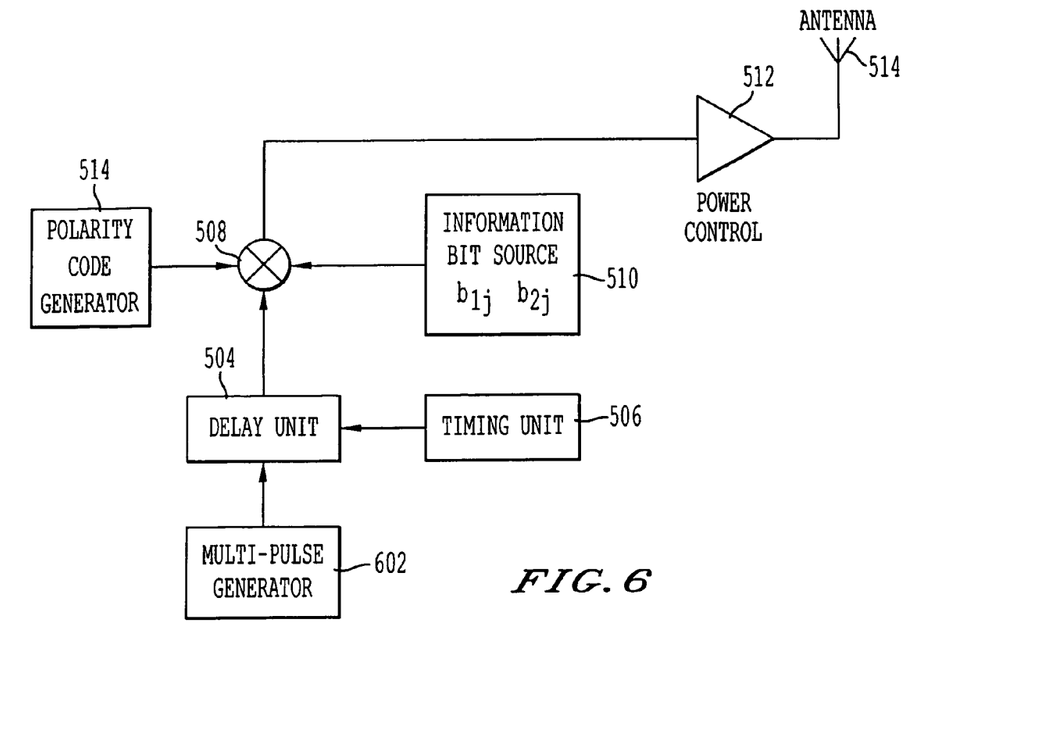
FIG. 6 is a block diagram of a multi-pulse transmitter according to an embodiment of the present invention.

FIG. 6 is a block diagram of a multi-pulse transmitter according to an embodiment of the present invention. This embodiment is similar to the embodiment of the single-pulse transmitter of FIG. 5, but this embodiment includes a multi-pulse generator 602 which is capable of generating pulses of more than one wave shape. In addition, in the multi-pulse transmitter the polarity code generator 514 may be configured to generate a single pseudo-random sequence or in an alternative embodiment, the polarity code generator may be configured to generate a different pseudo-random sequence for each pulse type.

Figure 7:
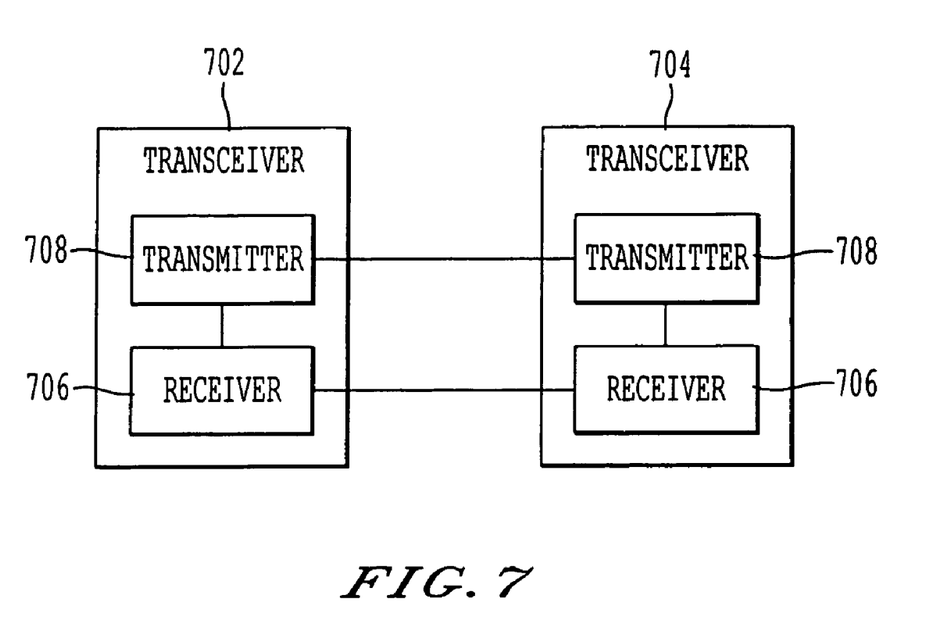
FIG. 7 is a block diagram of a communication system according to an embodiment of the present invention.

FIG. 7 is a block diagram of a transmitted reference ultra wide band communication system according to an embodiment of the present invention. In that embodiment, the system includes at least two transceivers 702/704 that communicate using a single-pulse or a multi-pulse signal, according to the present invention. Each of the transceivers 702/704 includes a receiver 706 and a transmitter 708. The receiver 706 includes at least one of a single-pulse or a multi-pulse receiver according to the present invention. The transmitter 708 includes at least one of a single-pulse or a multi-pulse transmitter according to the present invention (not shown).

The invention provides a less complex TR-UWB system using a single type of UWB pulse, which does not require a delay line at the receiver. The need for a delay line is removed by the matched filtering operation on the received signal, which filters the received signal according to a new template signal.

A system, transmitter, receiver, or signal according the present invention employ a novel signaling scheme where the first pulse or the second in a frame is chosen as the reference depending on the frame index. By this way, the receiver is able perform energy detection for bit estimation. The use of multiple types of UWB pulses has the advantage of better rejection of inter-frame and multiple-access interference. The receiver for the multi-pulse case has $N_p$ parallel branches, with $N_p$ being the number of pulse types, and each branch has the unique template signal at its matched filter.

Numerous modifications and variations of the present invention are possible in light of the above teachings. It is therefore to be understood that within the scope of the appended claims, the invention may be practiced otherwise than as specifically described herein.

The invention claimed is:

1. A transmitted reference ultra-wide band communication signal receiver comprising:
   a matched filter configured to filter a received signal and to produce a filtered signal, said matched filter having a predetermined impulse response that is an inverse of a template signal, said template signal including a first template pulse having a polarity value of +1 or −1, with equal probability, based on a first pseudo-random sequence and corresponding to a data pulse in the received signal and a second template pulse having a polarity value of +1 or −1, with equal probability, based on a second pseudo-random sequence and corresponding to a reference pulse in the received signal;
   an energy detector operatively connected to the matched filter and configured to detect energy in the filtered signal and to produce a detected energy signal; and
   a decision unit operatively connected to the energy detector and configured to determine a value of data by estimating information bit based on the detected energy signal and the first pseudo-random sequence and the second pseudo-random sequence corresponding to an encoded data pulse and an encoded reference pulse, respectively, where estimating the information bit is obtained by comparing decision variables to a threshold, in the received signal.

2. The receiver of claim 1, wherein the first pseudo-random sequence is different than the second pseudo-random sequence.

3. A transmitted reference ultra-wide band communication signal receiver comprising:
   a first matched filter configured to filter a received signal and produce a first filtered signal, said first matched filter having a first impulse response that is an inverse of a first template signal, said first template signal including a first template pulse having a polarity value of +1 or −1, with equal probability, based on a first pseudo-random sequence and having a predetermined wave shape the same as the wave shape of a first data pulse in the received signal;
   a first energy detector operatively connected to the first matched filter and configured to detect energy in the first filtered signal and produce a first detected energy signal;
   a second matched filter configured to filter the received signal and produce a second filtered signal, said second matched filter having a second impulse response that is an inverse of a second template signal, said second template signal including a second template pulse having a polarity value of +1 or −1, with equal probability, based on a second pseudo-random sequence and having a wave shape the same as the wave shape of a first reference pulse in the received signal;
   a second energy detector operatively connected to the second matched filter and configured to detect energy in the second filtered signal and produce a second detected energy signal; and
   a decision unit operatively connected to the first and second energy detectors and configured to determine a value of data by estimating information bit based on the first and second detected energy signals and the first pseudo-random sequence and the second pseudo-random sequence corresponding to an encoded first data pulse and an encoded reference pulse, respectively, where estimating the information bit is obtained by comparing combines decision variables to a threshold, in the received signal.

4. The receiver of claim 3, wherein the first pseudo-random sequence is different than the second pseudo-random sequence.

5. A transmitted reference ultra-wide band communication signal receiver comprising:
   a matched filter configured to filter a received signal and to produce a filtered signal, said matched filter having an impulse response that is an inverse of a template signal, said template signal including a sequence of template frames, each template frame in the sequence having a first template pulse corresponding to a data pulse in the received signal, the first template pulse having a polarity value of +1 or −1, with equal probability, based on a first pseudo-random sequence, and a second template pulse corresponding to a reference pulse in the received signal, the second template pulse having a polarity value of +1 or −1, with equal probability, based on a second pseudo-random sequence, each first template pulse of each template frame being configured to either precede or follow the corresponding second template pulse of the template frame by a delay time based on an ordering relationship of the template frame in the sequence of template frames;
   an energy detector operatively connected to the matched filter and configured to detect energy in the filtered signal and to produce a detected energy signal; and
   a decision unit operatively connected to the energy detector and configured to determine a value of data by estimating information bit based on the detected energy signals and the first pseudo-random sequence and the second pseudo-random sequence corresponding to an encoded data pulse and an encoded reference pulse, respectively, where estimating the information bit is obtained by comparing decision variables to a threshold, in the received signal.

6. The receiver of claim 5, wherein the first pseudo-random sequence is different than the second pseudo-random sequence.

7. A transmitted reference ultra-wide band communication signal transmitter comprising:
- a pulse generator configured to produce a data pulse and a reference pulse;
- a delay unit operatively connected to the pulse generator and a timing unit and configured to delay the data pulse and to delay the reference pulse based on a control signal received from the timing unit, wherein the timing unit configured to control a time delay between the reference pulse and the data pulse and also a frame starting and ending instants;
- a polarity code generator configured to generate a first pseudo-random polarity code sequence, which specifies polarity values of +1 and −1, with equal probability, according to a first pseudo-random code, for the data pulse and a second pseudo-random polarity code sequence, which specifies polarity values of +1 and −1, with equal probability, according to a second pseudo-random code, for the reference pulse;
- an information bit source configured to provide an information bit for the data pulse;
- a multiplier operatively connected to the polarity code generator, the information bit source and the delay unit, said multiplier configured to multiply the first pseudo-random polarity code sequence, the delayed data pulse and the information bit to produce a pseudo-randomly encoded data pulse and to multiply the second pseudo-random polarity code sequence and the delayed reference pulse to produce a pseudo-randomly encoded reference pulse;
- a power control unit operatively connected to the multiplier and configured to control a power of the encoded data pulse and the encoded reference pulse; and
- an antenna operatively connected to the power control unit and configured to broadcast the power controlled encoded data and reference pulses.

8. The transmitter of claim 7, wherein the first pseudo-random polarity code sequence is different than the second pseudo-random polarity code sequence.

9. The transmitter of claim 7, wherein a wave shape of the data pulse generated by the pulse generator is different than a wave shape of the reference pulse generated by the pulse generator.

10. The transmitter of claim 7, wherein the pulse generator is further configured to generate a sequence of frames, each frame including a data pulse and a reference pulse, and said data pulse in each frame being configured to either precede or follow the corresponding reference pulse of the frame based on an ordering relationship of the respective frame in the sequence of frames.

11. A transmitted reference ultra-wide band communication system comprising:
- a transmitter comprising,
- a pulse generator configured to produce a data pulse and a reference pulse,
- a delay unit operatively connected to the pulse generator and a timing unit and configured to delay the data pulse and to delay the reference pulse based on a control signal received from the timing unit, wherein the timing unit configured to control a time delay between the reference pulse and the data pulse and also a frame starting and ending instants,
- a polarity code generator configured to generate a first pseudo-random polarity code sequence, which specifies polarity values of +1 and −1 with equal probability according to a first pseudo-random code, for the data pulse and a second pseudo-random polarity code sequence, which specifies polarity values of +1 and −1 with equal probability according to a second pseudo-random code, for the reference pulse,
- an information bit source configured to provide an information bit for the data pulse,
- a multiplier operatively connected to the polarity code generator, the information bit source and the delay unit, said multiplier configured to multiply the first pseudo-random polarity code sequence, the delayed data pulse and the information bit to produce a pseudo-randomly encoded data pulse and to multiply the second pseudo-random polarity code sequence and the delayed reference pulse to produce a pseudo-randomly encoded reference pulse,
- a power control unit operatively connected to the multiplier and configured to control a power of the encoded data pulse and the encoded reference pulse, and
- an antenna operatively connected to the power control unit and configured to broadcast the power controlled encoded data and reference pulses; and a receiver comprising,
- a matched filter configured to filter a received signal and to produce a filtered signal, said matched filter having a predetermined impulse response that is an inverse of a template signal, said template signal including a first template pulse having a polarity based on the first pseudo-random polarity code sequence and corresponding to a data pulse in the received signal and a second template pulse having a polarity based on the second pseudo-random polarity code sequence and corresponding to a reference pulse in the received signal,
- an energy detector operatively connected to the matched filter and configured to detect energy in the filtered signal and to produce a detected energy signal, and
- a decision unit operatively connected to the energy detector and configured to determine a value of data by estimating information bit based on the detected energy signal and the first pseudo-random sequence and the second pseudo-random sequence corresponding to an encoded data pulse and an encoded reference pulse, respectively, where estimating the information bit is obtained by comparing decision variables to a threshold, in the received signal.

12. A transmitted reference ultra-wide band communication system comprising:
- a transmitter comprising,
- a pulse generator configured to produce a data pulse and a reference pulse,
- a delay unit operatively connected to the pulse generator and a timing unit and configured to delay the data pulse and to delay the reference pulse based on a control signal received from the timing unit, wherein the timing unit configured to control a time delay between the reference pulse and the data pulse and also a frame starting and ending instants,
- a polarity code generator configured to generate a first pseudo-random polarity code sequence, which specifies polarity values of +1 and −1 with equal probability according to a first pseudo-random code, for the data pulse and a second pseudo-random polarity code sequence, which specifies polarity values of +1 and −1 with equal probability according to a second pseudo-random code, for the reference pulse, an information bit source configured to provide an information bit for the data pulse, a multiplier operatively connected to the polarity code generator, the information bit source and the delay unit, said multiplier configured to multiply the first pseudo-random polarity code sequence, the delayed data pulse and the information bit to produce a pseudo-randomly encoded data pulse and to multiply the second pseudo-random polarity code sequence and the delayed reference pulse to produce a pseudo-randomly encoded reference pulse, a power control unit operatively connected to the multiplier and configured to control a power of the encoded data pulse and the encoded reference pulse, and an antenna operatively connected to the power control unit and configured to broadcast the power controlled encoded data and reference pulses; and a receiver comprising, a first matched filter configured to filter a received signal and produce a first filtered signal, said first matched filter having a first impulse response that is an inverse of a first template signal, said first template signal including a first template pulse having a predetermined wave shape the same as the wave shape of a first data pulse in the received signal, a first energy detector operatively connected to the first matched filter and configured to detect energy in the first filtered signal and produce a first detected energy signal, a second matched filter configured to filter the received signal and produce a second filtered signal, said second matched filter having a second impulse response that is an inverse of a second template signal, said second template signal including a second template pulse having a wave shape the same as the wave shape of a first reference pulse in the received signal, a second energy detector operatively connected to the second matched filter and configured to detect energy in the second filtered signal and produce a second detected energy signal, and a decision unit operatively connected to the first and second energy detectors and configured to determine a value of data estimating information bit based on the first and the second detected energy signals and the first pseudo-random sequence and the second pseudo-random sequence corresponding to an encoded data pulse and an encoded reference pulse, respectively, where estimating the information bit is obtained by comparing combined decision variables to a threshold, in the received signal.

13. A transmitted reference ultra-wide band communication system comprising:

a transmitter comprising, a pulse generator configured to produce a data pulse and a reference pulse, a delay unit operatively connected to the pulse generator and a timing unit and configured to delay the data pulse and to delay the reference pulse based on a control signal received from the timing unit, wherein the timing unit configured to control a time delay between the reference pulse and the data pulse and also a frame starting and ending instants, a polarity code generator configured to generate a first pseudo-random polarity code sequence, which specifies polarity values of +1 and −1 with equal probability according to a first pseudo-random code, for the data pulse and a second pseudo-random polarity code sequence, which specifies polarity values of +1 and −1 with equal probability according to a second pseudo-random code, for the reference pulse, an information bit source configured to provide an information bit for the data pulse, a multiplier operatively connected to the polarity code generator, the information bit source and the delay unit, said multiplier configured to multiply the first pseudo-random polarity code sequence, the delayed data pulse and the information bit to produce a pseudo-randomly encoded data pulse and to multiply the second pseudo-random polarity code sequence and the delayed reference pulse to produce a pseudo-randomly encoded reference pulse, a power control unit operatively connected to the multiplier and configured to control a power of the encoded data pulse and the encoded reference pulse, and an antenna operatively connected to the power control unit and configured to broadcast the power controlled encoded data and reference pulses; and a receiver comprising, a matched filter configured to filter a received signal and to produce a filtered signal, said matched filter having an impulse response that is an inverse of a template signal, said template signal including a sequence of template frames, each template frame in the sequence having a first template pulse corresponding to a data pulse in the received signal and a second template pulse corresponding to a reference pulse in the received signal, each first template pulse of each template frame being configured to either precede or follow the corresponding second template pulse of the template frame by a delay time based on an ordering relationship of the template frame in the sequence of template frames, an energy detector operatively connected to the matched filter and configured to detect energy in the filtered signal and to produce a detected energy signal, and a decision unit operatively connected to the energy detector and configured to determine a value of data by estimating information bit based on the detected energy signal and the first pseudo-random sequence and the second pseudo-random sequence corresponding to an encoded data pulse and an encoded reference pulse, respectively, where estimating the information bit is obtained by comparing decision variables to a threshold, in the received signal.

* * * * *